(12) United States Patent
Nakamura

(10) Patent No.: US 6,844,888 B2
(45) Date of Patent: Jan. 18, 2005

(54) IMAGE WRITING DEVICE, LIGHT SOURCE, LIGHT SOURCE UNIT, MICROLENS AND FABRICATION METHOD FOR MICROLENS

(75) Inventor: Tetsuroh Nakamura, Takaraduka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 93 days.

(21) Appl. No.: 10/108,421

(22) Filed: Mar. 29, 2002

(65) Prior Publication Data

US 2002/0140918 A1 Oct. 3, 2002

(30) Foreign Application Priority Data

Mar. 29, 2001 (JP) ........................................ 2001-095376
Mar. 29, 2001 (JP) ........................................ 2001-095814

(51) Int. Cl.[7] ............................... B41J 2/45; B41J 2/385
(52) U.S. Cl. ........................................ 347/138; 347/130
(58) Field of Search ................................ 347/130, 238, 347/241, 244, 256, 258, 137, 132; 313/509; 399/4; 372/50; 385/124; 359/652

(56) References Cited

U.S. PATENT DOCUMENTS

| 4,553,148 A | * | 11/1985 | Behrens et al. ............. 347/244 |
| 4,971,423 A | * | 11/1990 | Nakata et al. ............... 385/124 |
| 5,341,195 A | * | 8/1994 | Satoh ............................ 399/4 |
| 5,568,320 A | * | 10/1996 | Rees et al. ................... 359/652 |
| 5,802,092 A | * | 9/1998 | Endriz .......................... 372/50 |
| 5,936,347 A | * | 8/1999 | Isaka et al. .................. 313/509 |
| 6,297,842 B1 | * | 10/2001 | Koizumi et al. ............. 347/237 |
| 6,538,682 B2 | * | 3/2003 | Ohkubo ....................... 347/241 |
| 6,583,805 B2 | * | 6/2003 | Mashimo et al. ............ 347/241 |

FOREIGN PATENT DOCUMENTS

| JP | 64-018659 | | 1/1989 | |
| JP | 02062256 A | * | 3/1990 | ............. B41J/2/45 |
| JP | 04101101 A | * | 4/1992 | ............. G02B/3/00 |
| JP | 08-166555 | | 6/1996 | |
| JP | 09-109455 | | 4/1997 | |
| JP | 10223367 A | * | 8/1998 | ........... H05B/33/02 |
| WO | WO 02/07427 A1 | | 1/2002 | |

* cited by examiner

*Primary Examiner*—Hai Pham
(74) *Attorney, Agent, or Firm*—McDermott Will & Emery LLP

(57) ABSTRACT

Not only is down sizing of an image writing device achieved by reducing a conjugate distance but also a diameter of a spot light impinging on a photosensitive drum for illumination can be freely varied. The image writing device is equipped with a light source having a light emission layer formed on a transparent substrate and a microlens array configured so as to face the light source.

28 Claims, 20 Drawing Sheets

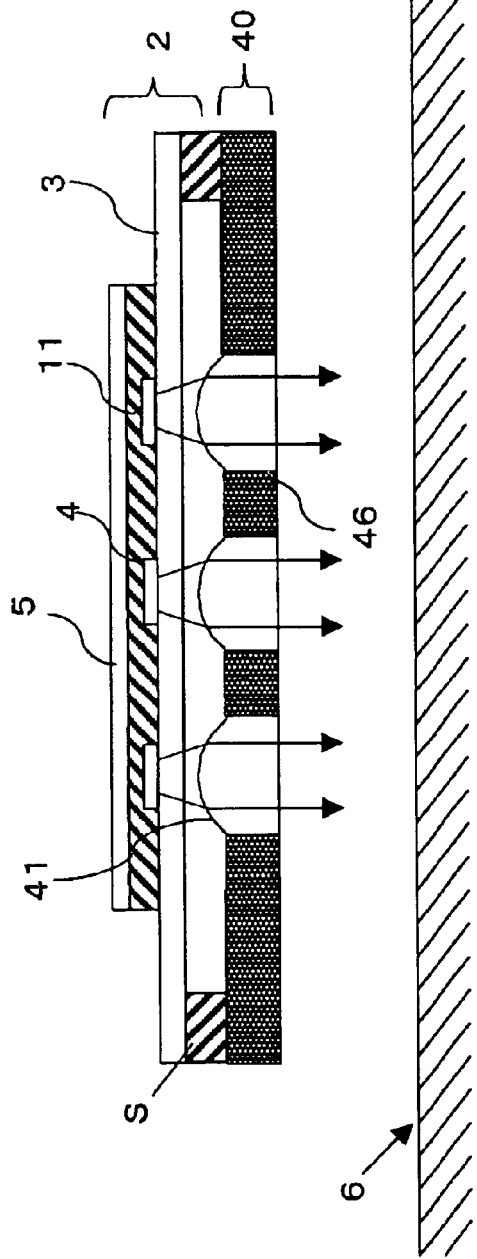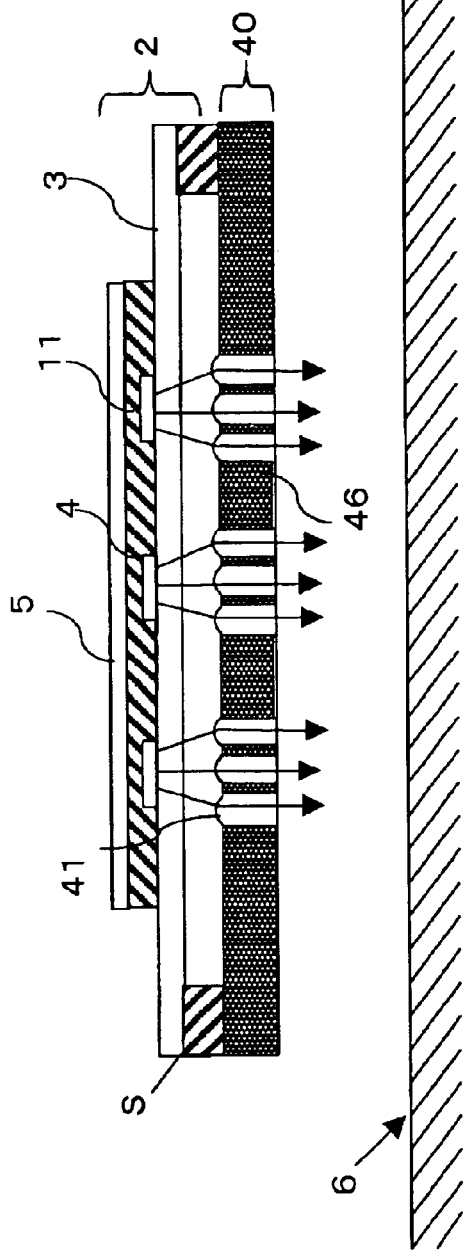

IMAGE WRITING DEVICE, LIGHT SOURCE, LIGHT SOURCE UNIT, MICROLENS AND FABRICATION METHOD FOR MICROLENS

BACKGROUND OF THE INVENTION

1. Field of the Invention

The present invention relates to an image writing device, and particularly to a light source unit for an image writing device.

2. Prior Art of the Invention

A multifunctional printer having functions such as of a copier, a scanner, a printer and a facsimile machine is equipped with an image writing device writing image data such as letters, graphics and electrophotographs stored in a storage medium such as a hard disk onto a original sheet.

In the image writing device, as shown in FIG. 18, a LSU (a laser scanner unit) has been conventionally employed. The LSU has a structure in which a light source 104 emits light on the basis of image data on a specific scan line to acquire a light beam, and the light beam is exposed to a specific face of a polygon mirror 102 rotating at specific rotation speed to expose a light reflected at a reflection angle in a specific range to a photosensitive drum 101 through a f·θ lens 103.

In the image writing device equipped with the LSU, a necessity arises for accelerating the rotation speed of the polygon mirror 102 in proportion to a resolution or a printing speed of an image. In a case where, for example, an image data of 600 dpi (24 dots/mm) is printed at 200 mm/sec, a necessary rotation speed of the polygon mirror 102 having six reflective faces results in 24×200×60/6=48,000 RPM.

Considering a load received by bearings for the polygon mirror 102, a noise generated by rotation of the polygon mirror 102, however, it is not preferable to accelerate the rotation speed of the polygon mirror 102.

Thus, a configuration that a LED array 110 in which a number of LED elements 111 are arranged on a LED chip 112 as shown in FIG. 19 is arranged so as to oppose to a rod lens 113 as shown in FIG. 20 has been commonly employed in recent years. In this configuration, the light emitted from the LED array 110 is exposed to a photosensitive drum 101 through the rod lens 113.

In a case where the LED array 110 is adopted as a light source, a PN junction structure is required for each of the LED elements 111 in order to control light emission by flowing a current; therefore in turn requiring a specific space between adjacent LED elements 111. In a light source for an image writing device capable of printing an image of, for example, 600 dpi, LED elements of about 20 $\mu$m square are arranged with a pitch of about 42.3 $\mu$m.

While in order to print a high resolution image, necessity arises for a smaller spacing between the LED elements 111, a technical problem is raised in reducing a necessary space for accommodating a component to control light emission of an LED element 111. Therefore, the space has to be ensured by decreasing a size of the LED element 111 itself, but such down-sizing of an LED element 111 entails impossibility of acquiring a sufficient luminance for forming a latent image on a photosensitive member. In order to attain a sufficient luminance, a high voltage may be imposed on an LED 111 element, but with the result of adverse reduction in lifetime of the LED element 111.

In a conventional image writing device, a light source for one pixel was formed with one light emitting element (for example, an LED element 111). Therefore, in order to compensate dispersion of luminance in light emitting elements, correction means performing shading correction or the like was necessary for an image writing device. Dispersion of luminance include initial dispersion caused by a size dispersion generated in fabrication of light emission elements and uneven emission efficiencies of LED elements 111 and uneven change on standing in luminance of LED elements 111 according to respective use states thereof.

There exists a phenomenon that an luminance at the periphery of an area illuminated with light on a specific surface is lower than at a central portion thereof. For this reason, in a case where a light source of one pixel is formed with one light emitting element, an illuminance at the periphery has a chance to be lowered as compared with that at the central portion, in an area corresponding to each pixel illuminated with a light beam. Hence, the periphery of each pixel is lighter on a print than the central portion thereof, having lead to a problem that a sharp image is unable to be printed.

In order to down-size an image writing device, a method has been available in which a distance from an LED element 111 to the photosensitive drum 101 (hereinafter referred to as a conjugate distance) is shortened. In order to reduce a conjugate distance, a diameter of each rod lens 113 has to be decreased.

As the diameter decreases, however, optical noise such as cross talk between rod lenses and flare light increases. That is, there has been a limitation on development in down-sizing of the device based on a prior technique.

In a case where a rod lens 113 is employed as a collective lens as in a prior art, a rod lens 113 has to be adopted with which a diameter of a spot light impinging for illumination on the photosensitive drum 101 is the same as a diameter of a light source (an LED element 111).

SUMMARY OF THE INVENTION

The present invention, in light of the above circumstances, provides a light source for a small-sized image writing device capable of writing high resolution image data or the like at high speed and adjusting a luminance of a light source of each pixel with ease.

The present invention adopts the following means in order to achieve the object:

First of all, in the present invention, an image writing device is a precondition in which a light emitted from a light source is exposed to a photosensitive drum through a collective lens.

The light source 2 is constituted of a transparent substrate 3 on one surface of which emission segments are formed and the other surface of the transparent substrate 3 and the collective lens are configured facing each other. With such a configuration, a focus point of light emitted from a emission segment 11 can be located on the photosensitive drum 6 by adjusting a thickness of the transparent substrate 3.

Moreover, by forming a light source of one pixel with plural emission segments 11 and controlling the number of emission segments to emit light, an image without unevenness can be printed even without performing shading correction. Still moreover, a luminance of a light source corresponding to each pixel can be varied by adjusting the number of emission segments 11 to be emitted.

Furthermore, by forming a light source of one pixel with many emission segments 11, the periphery of an area illuminated with one light beam can be illuminated with another light beam, resulting in a more uniform illuminance distribution on the photosensitive drum 6 than in a prior art. Therefore, a sharp image can be printed.

By using a self-luminous electroluminescence film as a emission segment 11, a spacing between adjacent emission segments 11 can be reduced without decreasing a size thereof.

In addition, in order to down-size an image writing device, a microlense 41 for transmitting light quantity is used as a collective lens. The light quantity transmission scheme is a system of transmitting (emitting) a light quantity (not an image) incident on a lens.

Since a size of the microlens 41 itself is small, a distance from the light source 2 to the photosensitive drum 6 can be as small as 3 mm or less. Needless to say that an image writing device can be considerably smaller than a prior art device of its kind.

Moreover, by adopting such a microlens 41, a diameter of a spot light on the photosensitive drum 6 can be freely varied as described below.

That is, since a rod lens of an image transmission scheme was employed in a prior art, a restraint was imposed such that a diameter of an LED element 111 was equal to that of the spot light, which is required for projecting a clear image on the photosensitive drum 6.

In contrast to this, since in the present invention, the microlens 6 of a light quantity transmission scheme are adopted, a difference in diameter between the light source piece 11 and the spot light, if any, would not have a chance to cause an image projected on the photosensitive drum 6 to be unclear.

According to the present invention, as described above, since a diameter of a spot light on the photosensitive drum 6 can be freely varied, needless to say that an image can be projected on the photosensitive drum 6 without a gap.

BRIEF DESCRIPTION OF THE DRAWINGS

FIGS. 16A and 16B are views showing an optical source unit in which microlenses are used as a collective lens;

DESCRIPTION OF THE PREFERRED EMBODIMENTS

First Embodiment

Figure 1:
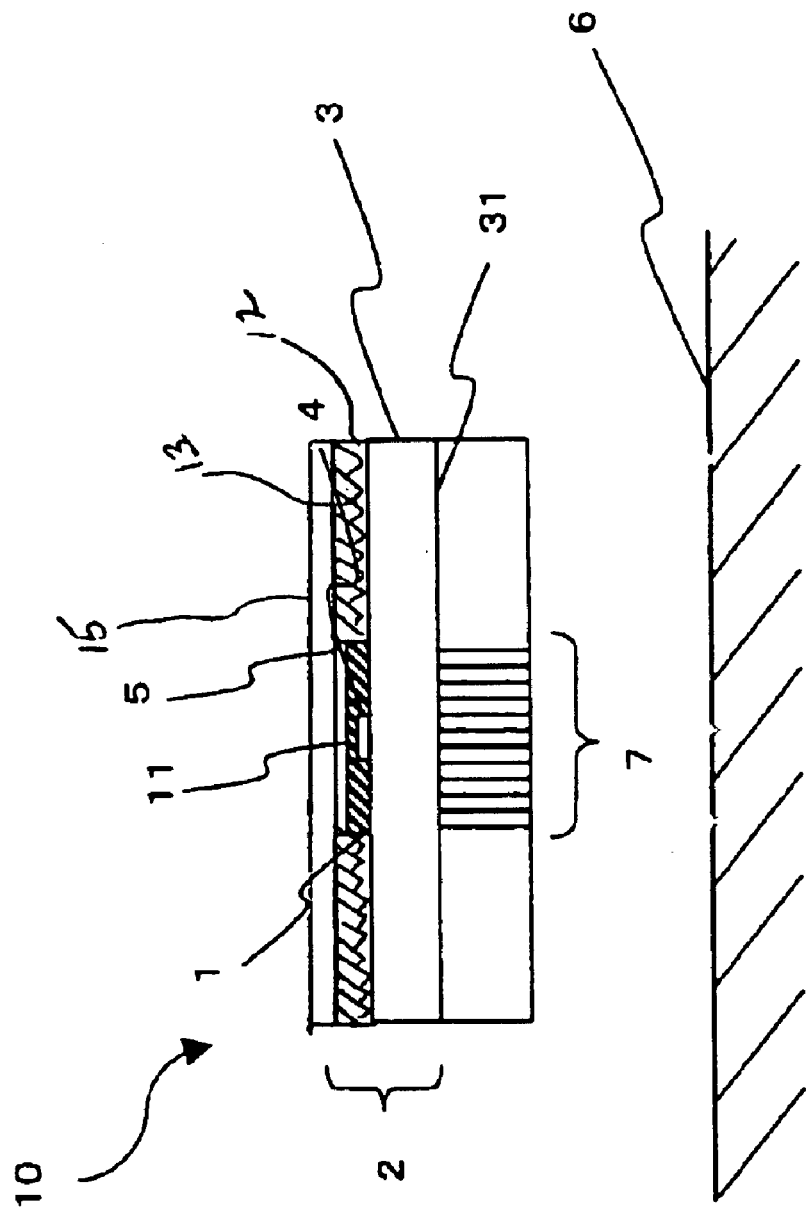
FIG. 1 is a view of construction of a main part of an image writing device to which the present invention is applied.
Figure 2A:
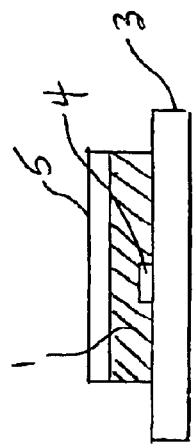
FIG. 2A is a view showing a fabrication process of a light source means.
Figure 2B:
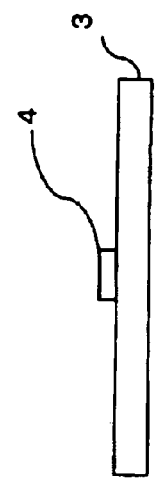
FIGS. 2B to 2D are views showing a fabrication process of a light source.
Figure 2C:
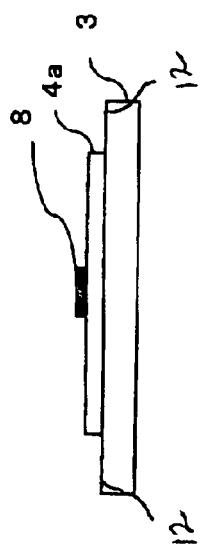
Figure 2D:
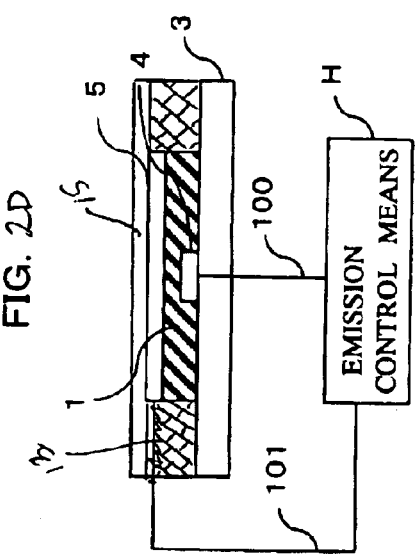

FIG. 1 is a view showing a light source unit 10 for an image writing device of the present invention. A light source 2 of the light source unit 10 is fabricated according to a process shown below. A transparent electrode layer 4a such as an ITO (indium tin oxde) electrode or the like is, as shown in FIG. 2A, laminated on one surface of a transparent substrate 3 longer in the main scan direction of the image writing device except for sealing sections 12 of 0.3 to 0.5 mm in width from end surfaces of transparent substrate 3. Then, portions of the transparent electrode layer 4a, which are formed into transparent electrode segments 4, are masked with a shielding film 8, followed by a photolithographic process such as exposure, developing, etching and others combined, thus fabricating transparent electrode segments 4 of a specific area, arranged in a matrix (FIG. 2B). Subsequent to this, an electroluminescence film (hereinafter referred to as a light emission layer 1) is laminated all of the electrode segments 4 and a metal electrode layer 5 is laminated on the light emission layer 1 as a common electrode 5 (FIG. 2C). Then, a resin 13 with adhesion such as epoxy resin is coated on the sealing sections 12 for sealing. At the last stage, the metal electrode layer 5 and the resins 13 are covered with a sealing glass 15 (FIG. 2D). Thereby, the light source 2 is completed. The reason why the resin 13 is coated and the sealing glass 15 is applied for coverage in such a manner is that an electroluminescence is prevented from receiving physical damage and from intrusion of moisture into a light source 2.

On the other hand, each of the transparent electrode segments 4 is lead out to a emission control means H through leads 100a, 100b, . . . shown in FIG. 2C while the metal electrode layer 5 is lead out to the emission control means H through a lead 101. The emission control means H controls voltages applied to the leads 100a, 100b, . . . and the lead 101 to control light emission of the light emission layer 1.

When prescribed voltages are applied to the transparent electrode segments 4 and the metal electrode layer 5, constructed as described above, by the emission control means H an electrical field is formed in the light emission layer 1 in a portion located above the transparent electrodes 4 (the portion located above the transparent electrodes 4 are hereinafter referred to as an emission segment 11) to emit light.

In this embodiment, the emission segment 11 is in the shape of a square having lengths in the main scan direction and the sub-scan direction of, for example, 10 μm. The description will be given in the setting that the transparent electrode segments 4 are arranged with a pitch of, for example, 14.1 μm in the main scan direction.

Figure 19:
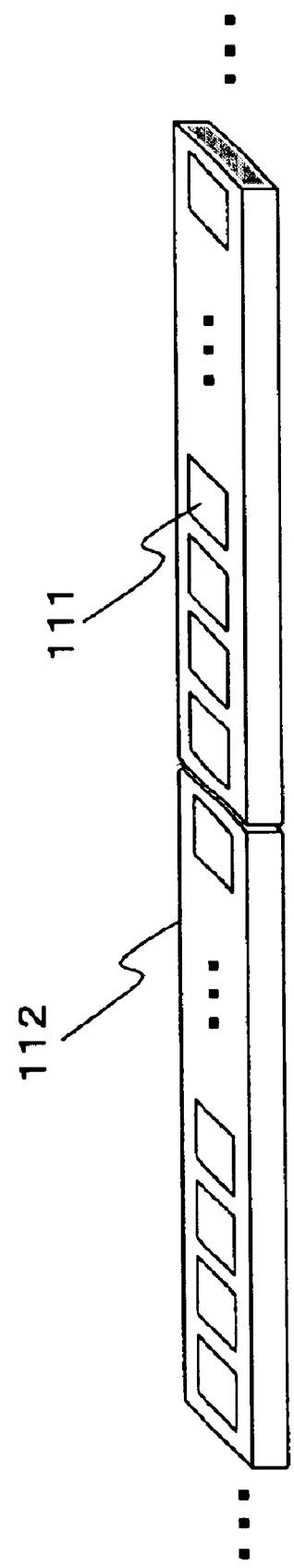
FIG. 19 is a view describing an LED array.
Figure 20:
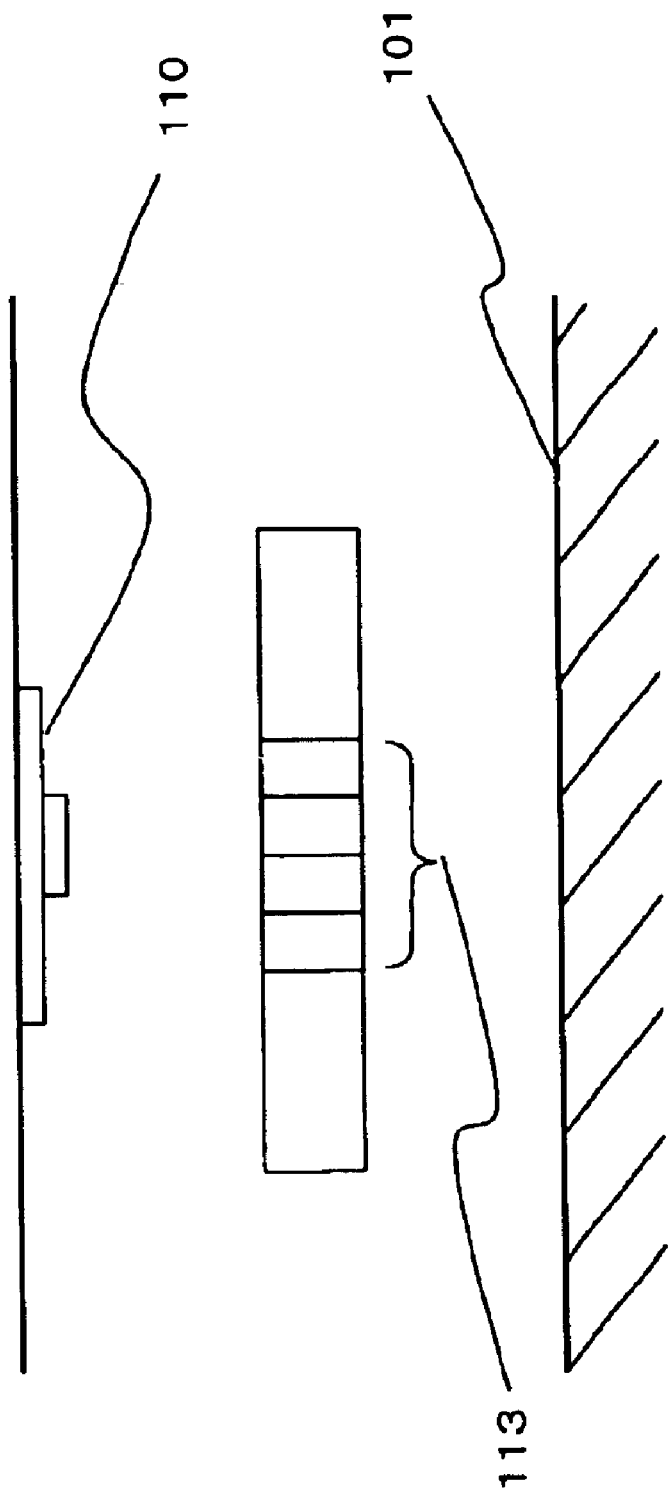
FIG. 20 is a view describing a conventional image writing device.

The reason why emission segments 11 can be, in such a way, formed with a smaller spacing therebetween as compared with the LED elements 111, shown in FIG. 19, is that an electroluminescence film itself emits light, so no necessity arises for using a complex process such as diffusion in a semiconductor process. By forming emission segments 11 with a small spacing therebetween as described above, plural emission segments 11 can also be used as a light source for one pixel.

Figure 3:
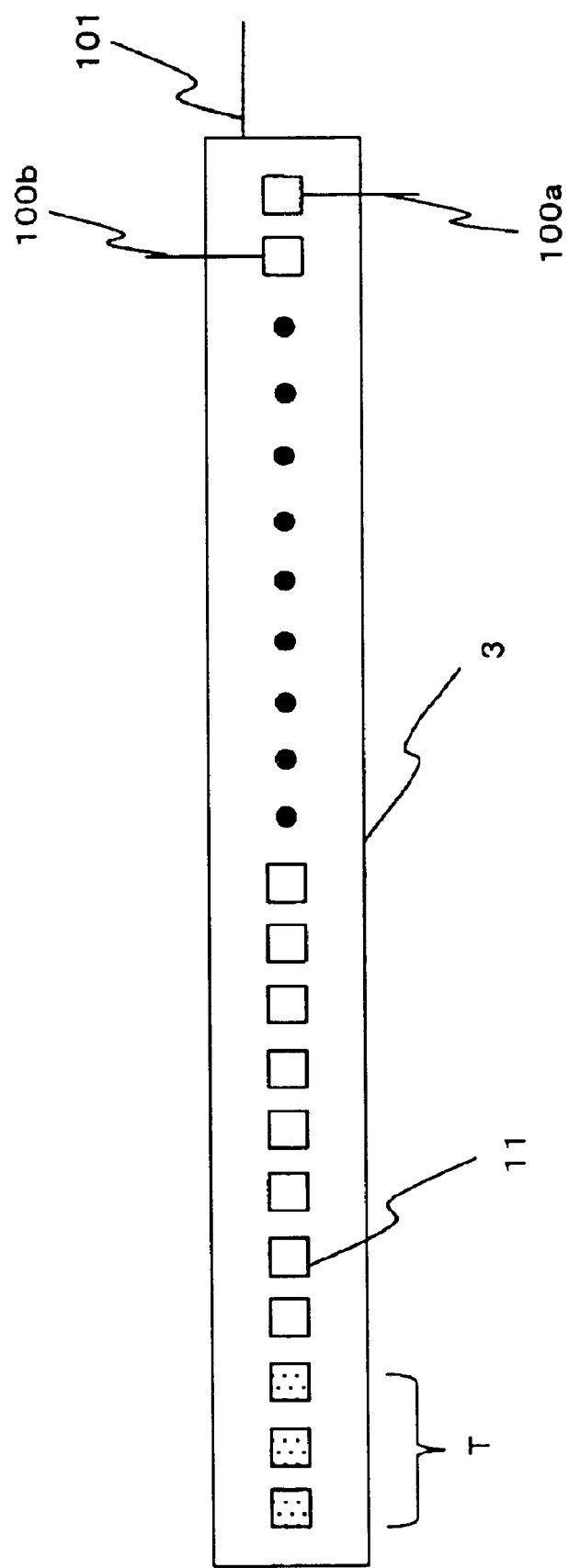
FIG. 3 is a view showing a transparent substrate on which plural light source pieces are formed.

The number of emission segments 11 arranged in the main scan direction is determined on the basis of a printable size of an image writing device. For example, if a printable size of the image writing device is 298 mm in the width direction of a paper size A3, the emission segments 11 are, as shown in FIG. 3, formed in number of a total of 298 mm/14.1 μm≈21134.

For example, when a print instruction of image data of a paper size A3 is issued to an image writing device in which the light source 2 is incorporated, the emission control means H acquires image data, which is an object for printing, from a storage medium (not shown). If a resolution of the acquired image data is 600 dpi, the number of pixels in the width direction (298 mm in length) of the image data amounts to (600/25.4)×298≈7039. Therefore, a light source for one pixel can be constructed of emission segments 11 in number of 21134/7039≈3.

Figure 4:
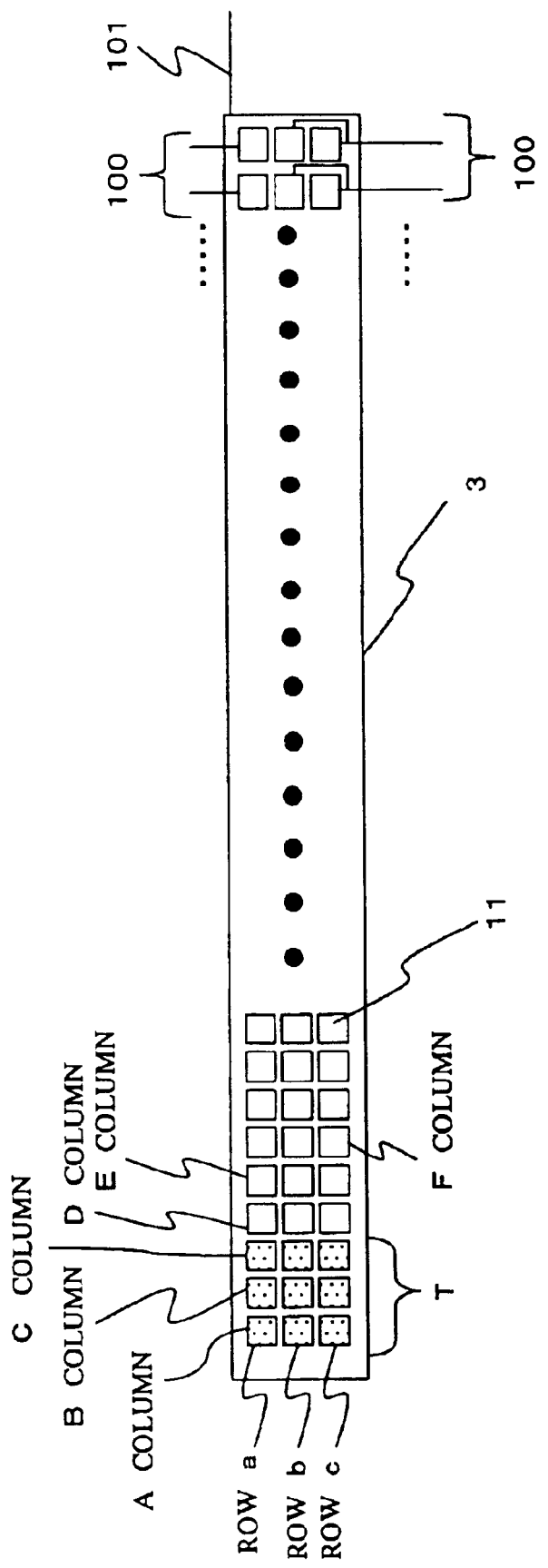
FIG. 4 is a view showing transparent substrate on which light source pieces are arranged in three rows.

Moreover, a specific number (for example, 3 as the specific number thereof corresponding to one pixel) of the transparent electrode segments 4, for example as shown in FIG. 4, may be arranged with a specific pitch of, for example, 14.1 μm pitch in the sub-scan direction (on rows a, b and c). By arranging 3 pieces, a light sources for pixels of 600 dpi can each be constructed of emission segments in number of 3×3=9 as a product of specific numbers in the main scan direction and the sub-scan direction, respectively.

By constructing a light source for one pixel with many emission segments 11, the periphery of an area illuminated with one light beam can be illuminated with another light beam, resulting in a more uniform illuminance distribution as compared with that in a prior art. Therefore, a sharp image can be printed.

The light source 2, as described in FIG. 1, has a light emission surface 31, which is the other surface of a transparent substrate 3 and the light emission surface 31 is indirect contact with a collective lens 7. Light emitted from a emission segment 11 passes through the transparent electrode segments 4, the transparent substrate 3 and the collective lens 7 to impinge on the photosensitive drum 6.

With such a construction, a distance from the collective lens 7 to the emission segment 11 depends only on a thickness of the transparent substrate 3. Accordingly, by adjusting a thickness of the transparent substrate 3 to set a distance between the collective lens 7 and the emission segment 11, a focal point of light emitted from the emission segment 11 can be positioned on the photosensitive drum 6.

Furthermore, as a measure to reduce a thickness and size of an image writing device, it is considered to use lens cells, which is a collection of fine diameter lenses, as the collective lens 7. This is because a fine diameter lens has a short focal length. As a fine diameter lens, there can be used a fiber lens proposed by the applicant of the present application in JP 2000-2241656, which will be described below.

Figure 5:
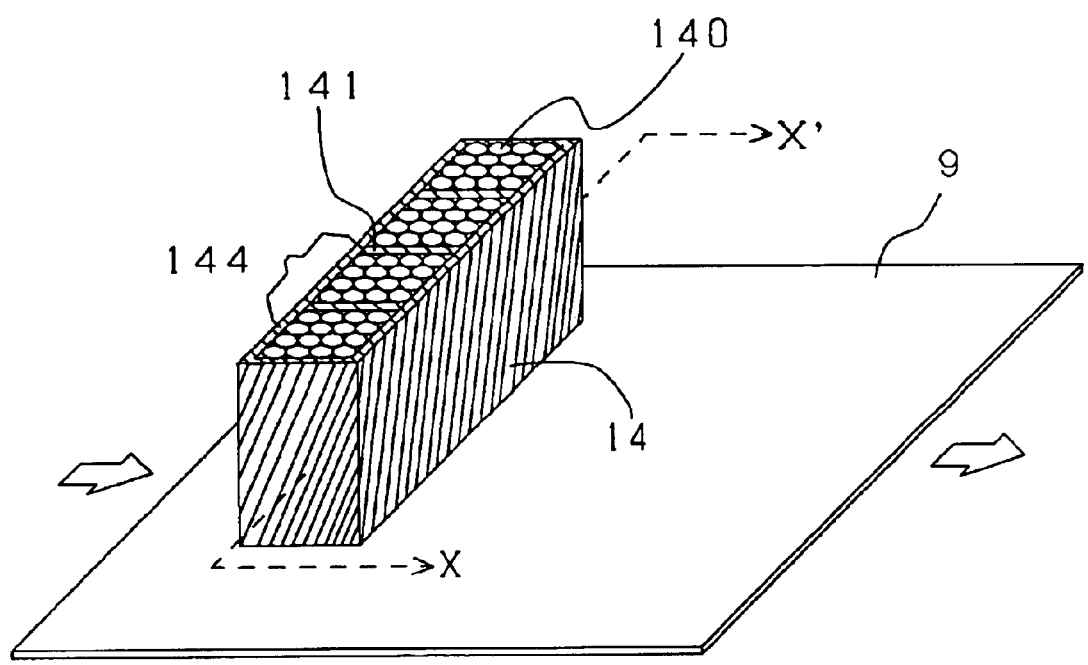
FIG. 5 is a perspective view of a fiber lens equipped in an image writing device.
Figure 6:
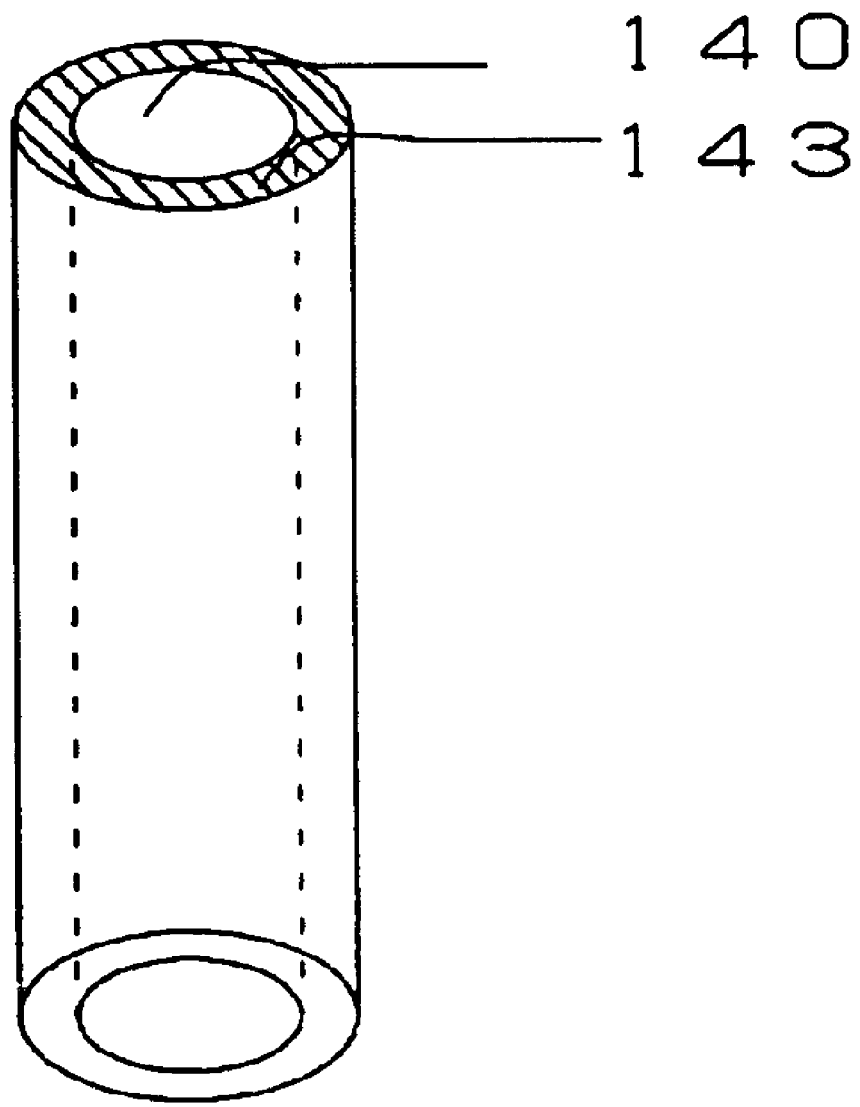
FIG. 6 is a perspective view of an optical fiber.

A construction of a fiber lens array proposed by the applicant of the present application is, as shown in FIG. 5, such that each fiber lens 14 is constituted of a bundle of optical fibers 140 each of a fine diameter, that is 0.5 mm or less in diameter. In the mean time, use of such a fine diameter causes a fault that phenomena such cross-talk, flare and so on occur conspicuously. Therefore, a light absorbing layer 143 is formed on the outer peripheral surface of each specific optical fiber 140, as shown in FIG. 6, of a specific length itself, or alternatively, plural optical fibers 140 of a specific length are, as shown in FIG. 5, bundled together and a light absorbing layer 141 is formed on the outer peripheral surface of a fiber bundle 144, thereby enabling the fault to be solved.

Figure 7:
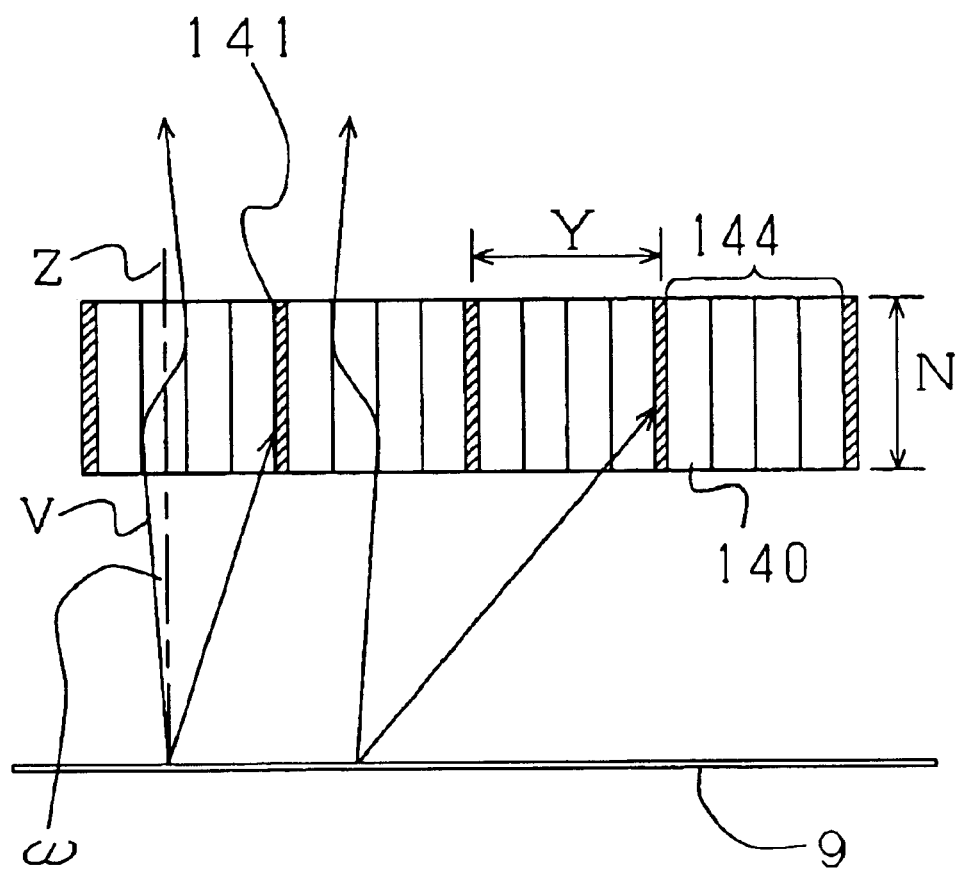
FIG. 7 is a sectional view taken along line X–X' of the optical fiber lens.

For example, in order to prevent from phenomena such as the cross talk and flare, the fiber bundle 144 has to meet the following relationship: That is, as shown in FIG. 7, a length Y of a side of the fiber bundle 144 and an angular aperture ω, which is an angle between a central axis U of an optical fiber 140 and an incident light ray V, are set such that a relation is met that a quotient obtained by dividing a length Y of a side of the fiber bundle 144 by a length N of an optical fiber 140 is smaller than a tangent value of the angular aperture ω. The angular aperture ω is the maximum angle at which light can be transmitted in a normal way. In FIG. 7, there is shown an optical state of the fiber bundle 144 where a light ray V impinges on an optical fiber 140 at the maximum angle at which light can be transmitted in a normal way and on this figure, an angle between a central axis U of an optical fiber 140 and an incident light ray V corresponds to the angular aperture ω.

Figure 8:
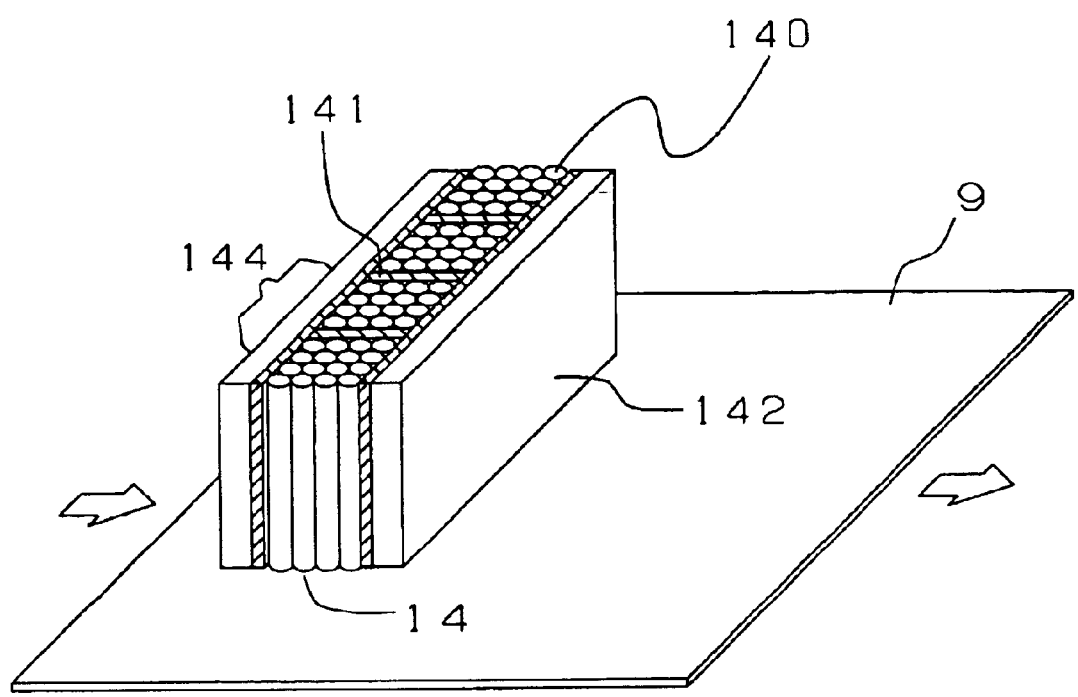
FIG. 8 is a perspective view of a fiber lens equipped in an image writing device.

As in such a construction, plural optical fibers 140, which are individually separated and on each of which a light absorbing layer 143 is formed, or alternatively, plural fiber bundles 144, on each of which a light absorbing layer 141 is formed are vertically accommodated in a molding die open at both ends of a specific shape to fill gaps between the optical fibers 140 with an adhesive and to harden the adhesive, followed by breaking and removing the molding die. The specific shape of the molding die is a shape necessary for exerting a essential function of an image writing device or others using the fiber lens 14, which is ordinarily of a band like having the same length as a page length of a original sheet in the same direction as the main scan direction. Moreover, if a necessity arises in molding as shown in FIG. 8, a process is allowed that the optical fibers 140, which are individually separated, or alternatively, the fiber bundles 144 are sandwiched between substrates 142 of nontransparent glass, resin or the like within the molding die, whereby the substrates 142 and the optical fibers 140, which are individually separated, or alternatively the fiber bundles 144 are caused to adhere therebetween according to the above described method.

Furthermore, another process (not shown) is applied in which plural optical fibers 140, which are individually separated and on each of which a light absorbing layer 143 is formed, or alternatively, plural fiber bundles 144, on each of which a light absorbing layer 141 is formed are arranged in close contact with each other in a diameter direction. Then, gaps between the fiber bundles 144 are filled with an adhesive, followed by sandwiching the fiber bundles 144 between substrates 142 of nontransparent glass, resin or the like. Then, by hot press, the adhesive is hardened.

Note that the optical fiber 140 has a graded refractive index decreasing from the axis toward the outer periphery thereof and light rays converge onto the central direction according to the principle without the above light absorbing layer 141 or 143. In actuality, as a diameter is smaller, adverse phenomena such as cross talk and flare, described above become more conspicuous, leading to a necessity for forming the light absorbing layer 141 or 143.

The light absorbing layers 141 and 143 can be formed by coating, dipping or evaporation deposition of a black resin. While an adhesive employed in a situation where the optical fibers 140, which are individually separated, or the fiber bundles 144 are densely packed within the molding die may be an adhesive used in a prior art, there is preferably used an adhesive in black color or the like color which can prevent from the adverse phenomena such as cross talk and flare, described above.

Here, in a case where an adhesive in black color or the like color additionally plays a role of a light absorbing layer 141, 143, the adhesive is coated on the outer peripheral surface of each of the optical fibers 140, which are individually separated, or the fiber bundles 144 to form an light absorbing film, followed by fabrication using a molding die of a specific shape open at both top and bottom ends in a similar manner to the above described case. As a matter of course, in the fabrication process, an operation is performed such that the adhesive in black color or the like color reaches every place on the entire outer peripheral surfaces of the optical fibers 140, which are individually separated, or the fiber bundles 144. As adhesives described above, for example, glass, a resin or the like material of a low softening point can be adopted. A softening point of an adhesive has to be lower than softening points of materials such as of an optical fiber 140 and the substrate 142 constituting of the fiber lens 14.

Since the fiber lens 14 has a shorter physical length and shorter focal length as compared with those of the rod lens 113 used in a prior art image writing device, slimmer versions of a light source unit 10 and an image writing device can be realized by using the fiber lens 14 as a collective lens 7.

Second Embodiment

In a case where a light source for one pixel is constructed of plural emission segments 11 as described above, the emission control means H, when receiving an instruction for printing as described above, acquires image data, for example, of a page size A3 of 600 dpi, which is an object for printing, from a storage medium. The emission control means H, when acquiring the image data, determines the number of emission segments 11 constituting a light source for one pixel. In the width direction of the image data, which is an object for printing, 7039 pixels are lined as described above, and in the light source 221134×3 emission segments 11 is arranged as described above. Therefore, the emission control means H determines that a light source for one pixel of the image data is constituted of 21134×3/7039≈9 emission segments 11.

Then, the emission control means H performs assignment of a emission segment group T serving as an light source for one pixel such that the emission segments 11 in columns A to C serve as a light source for a first pixel and the emission segments 11 in columns D to F serve as a light source for a second pixel.

Figure 9:
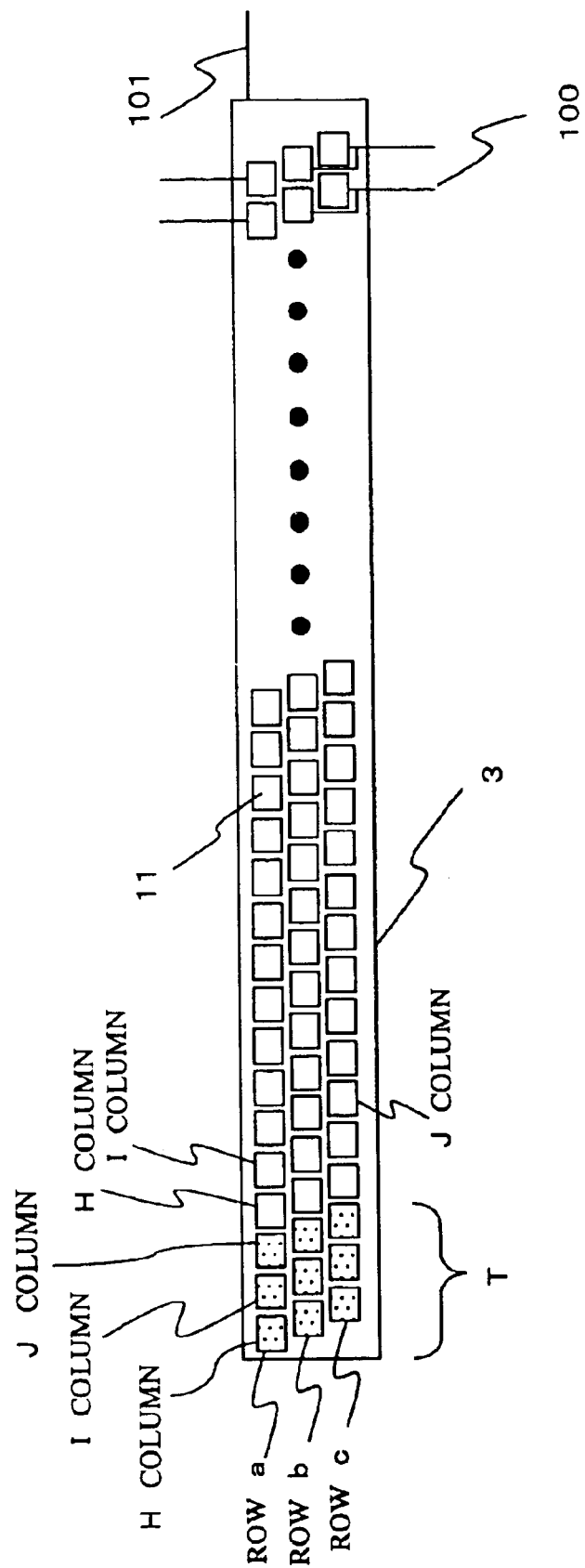
FIG. 9 is a view showing a transparent substrate on which emission segments are arranged so as to overlap each other in the width direction.

Note that, an arrangement pattern of emission segments 11 on transparent electrodes 4 are not specifically limited to a pattern but maybe arranged, as shown in FIG. 9, for example, such that a emission segment 11 overlaps another emission segment 11 in the width direction of the transparent substrate 3. In a case of an arrangement pattern as shown in FIG. 9, assignment of a emission segment group is such that for example, the emission segments 11 in columns H to J are assigned to a light source for a first pixel and the emission segments 11 in columns K to M are assigned to a second pixel.

The emission control means H, when completing the assignment of a emission segment group T, performs shading correction according to a luminance of the emission segment group T of each pixel.

The reason why the emission control means H performs the shading correction is that there exist various types of dispersion in luminance, as initial dispersion caused by size and thickness dispersion generated in fabrication of emission segments 11 and uneven emission efficiencies of emission segments 11 and uneven change on standing in luminance of emission segments 11 according to use environments such as a light emission frequency thereof.

As one example of a detailed process for shading correction implemented by the emission control means H, the following has been available: The emission control means H applies a specific voltage to the emission segment group T of each pixel to emit light and to measure a luminance of each emission segment group T at a specific reference surface. As a result of the measurement, the emission control means H, when writing image data onto a photosensitive drum, determines the number (S) of emission segments 11 to emit light in each emission segment group T on the basis of an equation shown below.

For example, in a case where a luminance of the nth emission segment group Tn starting from the left end shown in FIG. 4 is In and a luminance of a emission segment group Tmin having the lowest luminance is Imin, the number S of emission segments to emit light in the nth emission segment group Tn is Int(P×Imin/In) in order to make uniform luminance values of emission segment groups T (wherein P is the number of emission segments 11 constituting a emission segment group T and the number is 9 in this embodiment).

By constituting a light source for one pixel with plural emission segments 11 and then controlling the number of emission segments 11 to emit light, there can be easily performed shading correction according to dispersion in luminance among emission segment groups T.

The emission control means H, when completing shading correction, performs light emission control on emission segments 11 on the basis of data on each of the main scan lines in the image data, which is an object for printing. On the other hand, the photosensitive drum 6 is controlled so as to assume a specific rotation speed synchronized with light emission control on emission segments 11.

Furthermore, by adjusting the number of emission segments 11 constituting a emission segment group T of each pixel on the basis of a density value of each pixel of image data, a luminance of each emission segment group T can be adapted to the density value shown by the image data. For example, in a case where a specific pixel is black in color, all of the emission segments 11 is caused to emit light, while in a case where a specific pixel is gray in color, a specific number of emission segments 11 corresponding to a density in 9 emission segments is caused to emit light.

Moreover, since in the present invention, a light source of one pixel is constituted of plural emission segments 11, differences in illuminance between pixels on the photosensitive drum 6 decrease as compared with a case where an light source for one pixel is constituted of one emission segment 11. For example, in a case where a thickness of one emission segment 11 belonging to a specific emission segment group T is smaller than another emission segment belonging thereto, a higher electrical field is formed in the one emission segment 11; therefore, a lifetime of the one emission segment 11 is shorter than another light emission 11 of interest. Accordingly, if a lifetime of the one emission segment 11 expires, only the one emission segment 11 enters a non-emission state. Even in such a case, since the other 8 emission segments 11 emit light, the emission segment group T can maintain a luminance necessary as a light source.

While, description is given of the case where a emission segment group T is constituted of 9 emission segments 11, a configuration may be adopted in which in one light source 2, there are mixed emission segment groups T constituted of 4 emission segments 11 and emission segment groups T constituted of 5 emission segments 11. In this case, there is a difference in number of emission segments 11 between light emission groups; therefore, application of the same electrical field to all the light emission groups causes different luminance in respective groups. Therefore, the emission control means H forms a stronger electrical field in a emission segment group T including 4 pieces constituting a light source for one pixel than in a emission segment group T including 5 pieces constituting a light source for one pixel, thereby making uniform luminance values over pixels.

Third Embodiment

While in the above description, there are shown the cases in each of which the light source for an image writing device is constructed of one substrate, a necessity arises for forming transparent electrode segments 4, emission segments 11 and a metal electrode layer 5, all with a uniform thickness in order to attain a light source with a uniform luminance. It is technically hard, however, to fabricate a specific length or longer transparent electrode layer 4a, a light emission layer 1 and a metal electrode layer 5, all with a uniform thickness. Therefore, light source 2 is constructed by connecting plural light source pieces 21, in each of which a length of a transparent substrate 3 is adjusted such that a transparent electrode layer 4a, a light emission layer 1 and a metal electrode layer 5 can all be formed at respective uniform thickness.

Figure 10:
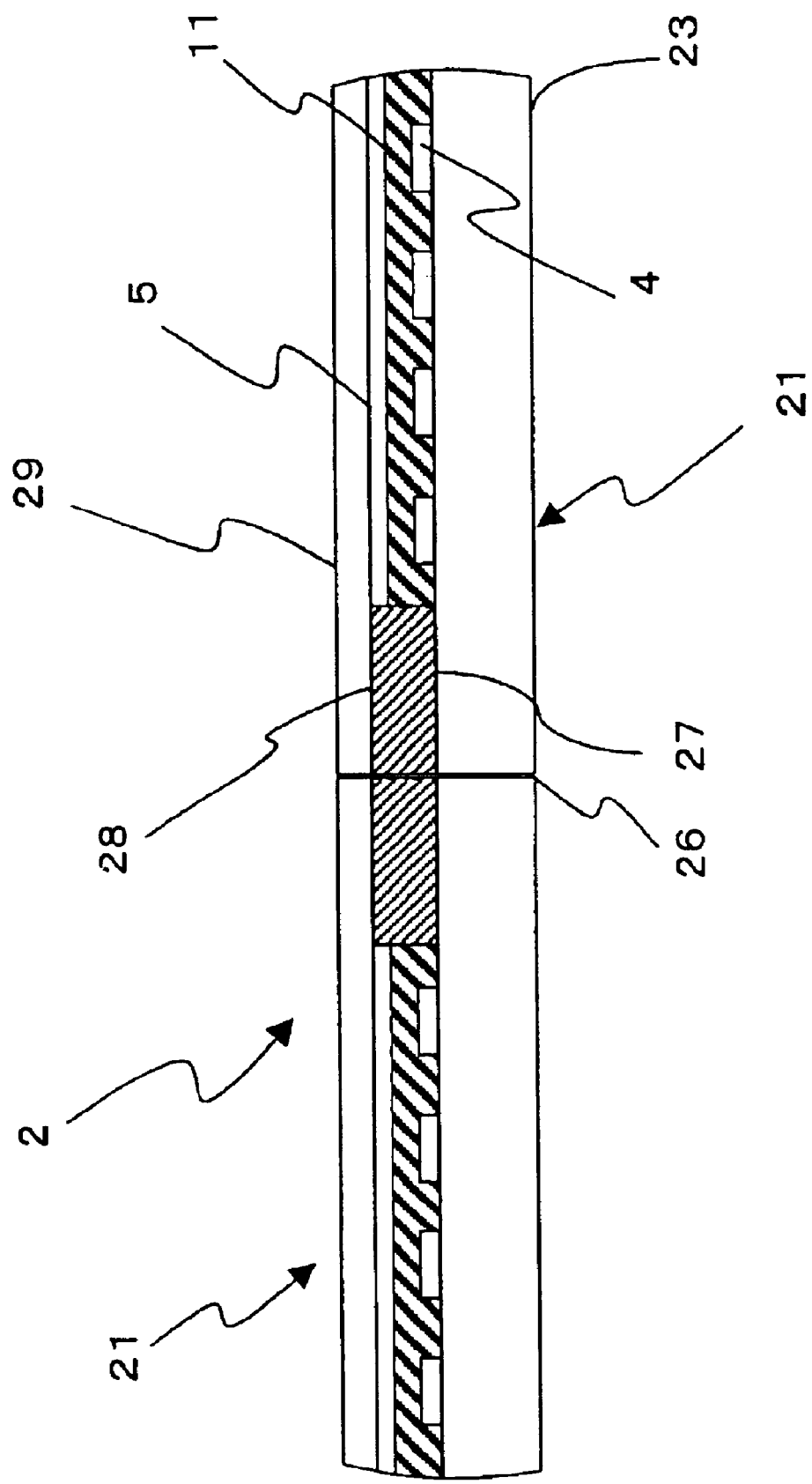
FIG. 10 is a sectional view of light source pieces.

As shown in FIG. 10, a transparent electrode layer 4a is, as described above, is laminated on a transparent substrate peace 23 except for sealing sections 27 of 0.3 to 0.5 mm in width from end surfaces 26 of transparent substrate pieces 23. Then, according to the same fabrication process as that for the light source 2 of the first embodiment, there are formed transparent electrode segments 4, emission segments 11 and metal electrode layers 5. Then, a resin 28 with adhesion such as epoxy resin is coated on the sealing sections 27 for sealing. At the last stage, the metal electrode layers 5 and the resins 28 are covered with a sealing glass 29. The reason why the resin 28 is coated and the sealing glass 29 is applied for coverage in such a manner is that an electroluminescence film used as a emission segment 11 is prevented from receiving physical damage and from intrusion of moisture into a light source piece 21.

Light source pieces 21 fabricated as described above are sequentially connected, end to end, to each other at opposed end surfaces 26 with adhesive or the like inserted therebetween to construct one light source 2. With a construction obtained by connecting light source pieces 21, a length (for example, 80 mm) of a transparent substrate piece 23 can be set such that a transparent electrode layer 4a, a light emission layer 1 and a metal electrode layer 5 can be all formed to respective uniform thickness, thereby enabling light source 2 with a uniform luminance to be attained.

Each of the light source pieces 21 shown in FIG. 10 is of the shape of a rectangle and has end surfaces 26 is in parallel to the width direction of a light source piece 21. Moreover, since an end section of a light source piece 21 serves as the sealing section 27, a luminance of light source 2 formed by connection of light source pieces 21 is reduced to almost zero in the neighborhood of the opposed end surfaces 26 of adjacent light source pieces 21. Therefore, in this embodiment, this attenuation in luminance is compensated in a manner described below.

Figure 11:
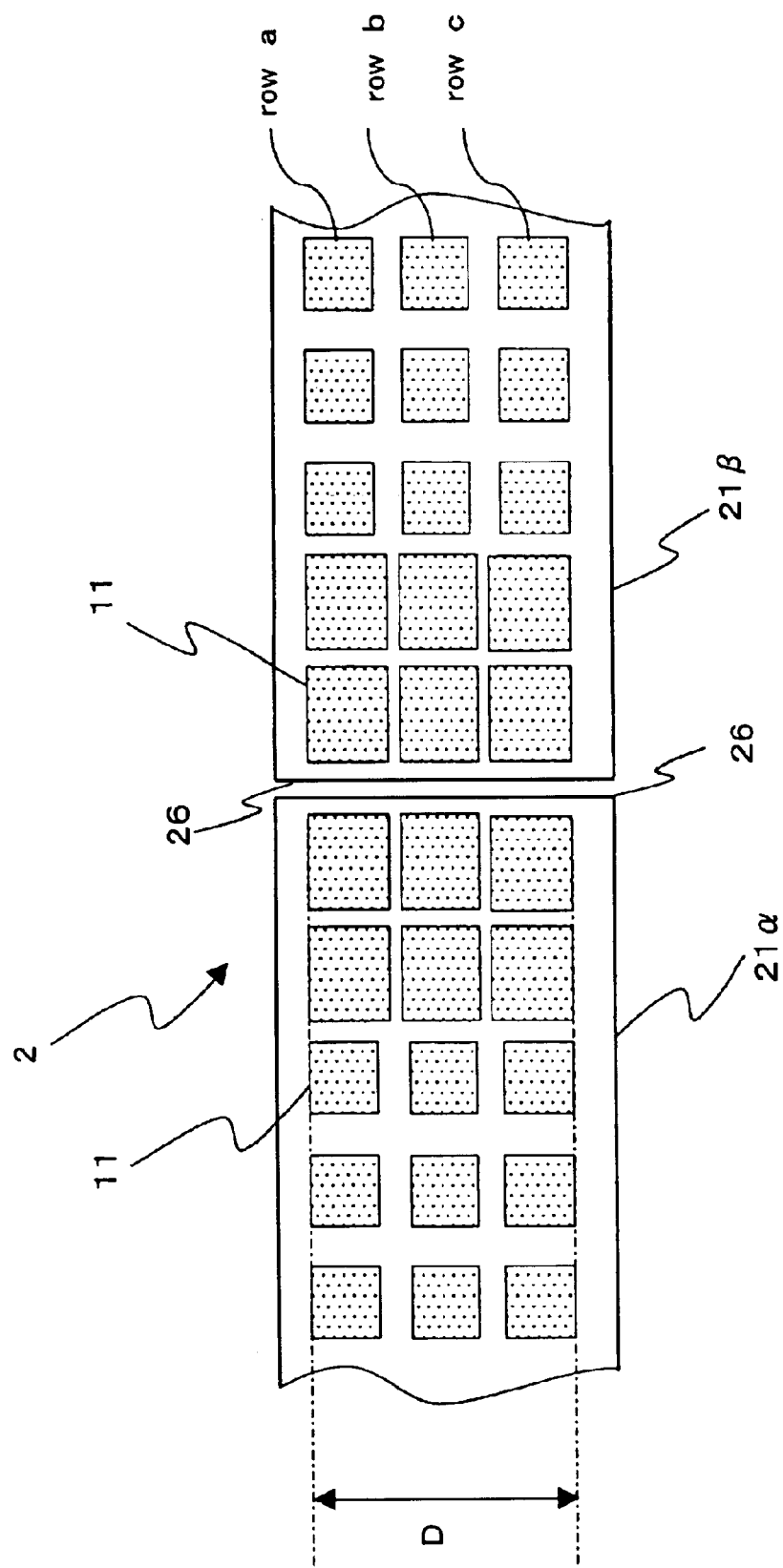
FIG. 11 is a view showing light source pieces each having emission segments located in end sections of rows thereof, an area of each of which is larger than those of the others on the rows.

As shown in FIG. 11, areas of emission segments 11 formed in regions covering as far as a specific distance from respective both end surfaces 26 of each light source piece 21 are larger than those of other emission segments 11. Thereby, attenuation of a luminance can be compensated in the neighborhood of the end surfaces 26 at which a light source piece 21 is connected to other light source pieces 21.

In a case of increasing areas of emission segments 11 located in the neighborhood of the end surfaces 26, neither part nor all of a emission segment 11 in the neighborhood of the end surfaces 26 is formed outside of a range D in the width direction in which emission segments are formed in the central section of a light source piece 21. When light source 2 in which part or all of a emission segment 11 is formed outside of the range D is used in an image writing device, a blurred or fuzzy image is resulted in a print. Accordingly, in a case where areas of emission segments 11 in the neighborhood of the end surfaces are increased 26, for example, the emission segments 11 are increased in length along the scan direction (in the length direction of a transparent substrate 3) or a spacing between emission segments 11 on rows a and b or rows b and c is reduced.

Note that in order to obtain a sufficient luminance in the neighborhood of end surfaces 26 of a light source piece 21, the number of emission segments 11 in the sub-scan direction formed in each of the end sections may be larger than in the central section.

Fourth Embodiment

Figure 12:
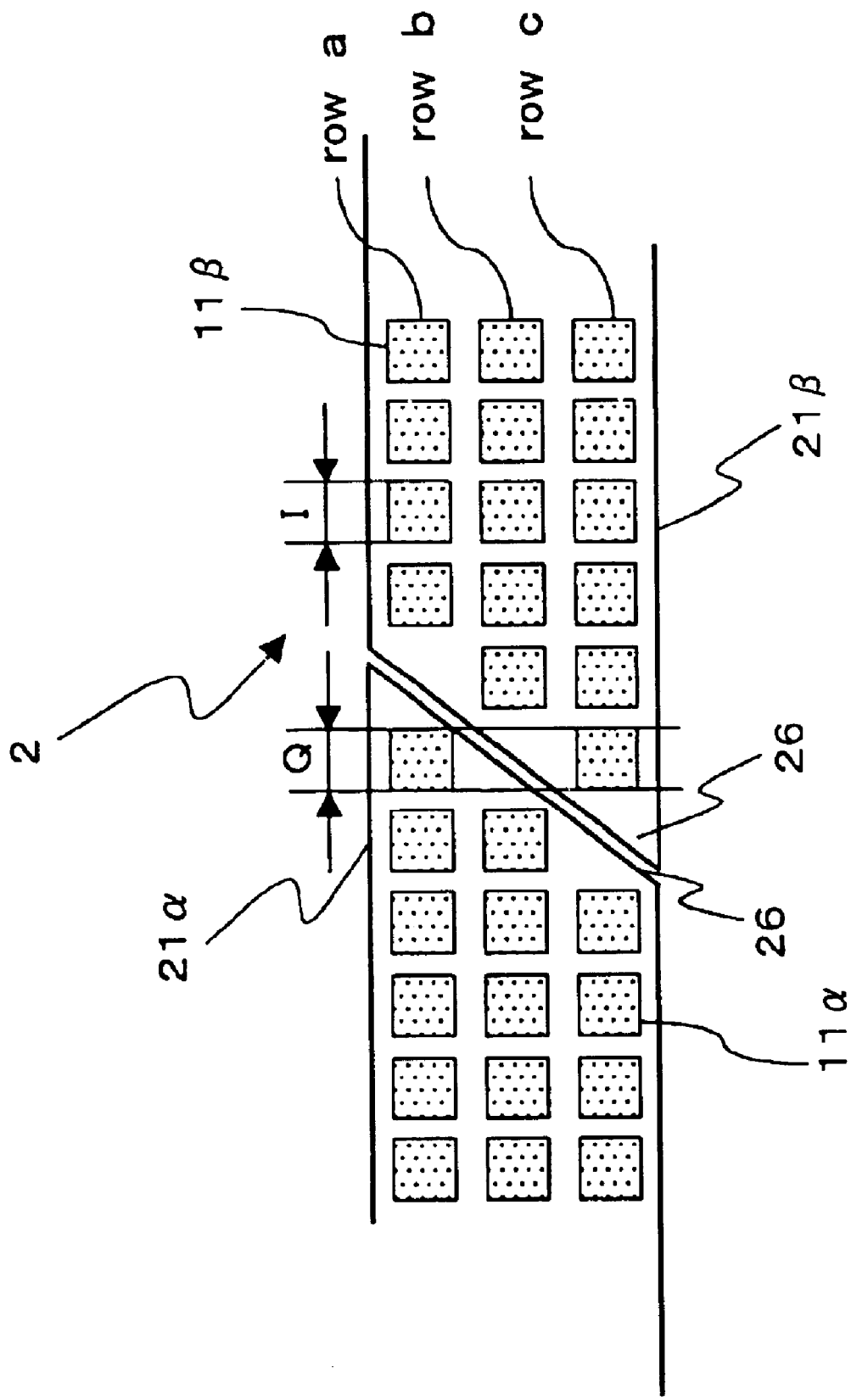
FIG. 12 is a view showing light source pieces whose end surfaces are oblique to the width direction.

The above fault is alleviated in a construction in which end surfaces of a light source piece 21 are, as shown in FIG. 12, oblique to the width direction (the sub-scan direction) of a light source 2. That is, as shown in FIG. 12, a shape of each of light source pieces 21α, 21β, . . . is a parallelogram and the light source pieces 21α, 21β, . . . are connected so as to overlap each other in the width direction. With such a construction, sealing sections 27 are formed so as to extend in the length direction, by which the sealing sections 27 at end surfaces 26 can be prevented from being localized at a specific, narrow portion.

Note that in a case where light source pieces 21 in the shape of such a parallelogram are connected to each other, a length Q along which emission segments 11α and 11β of the respective light source pieces 21α and 21β adjacent to each other overlap each other is desirably equal to or more than a distance I between the emission segments 11α and 11β in the main scan direction.

Figure 13:
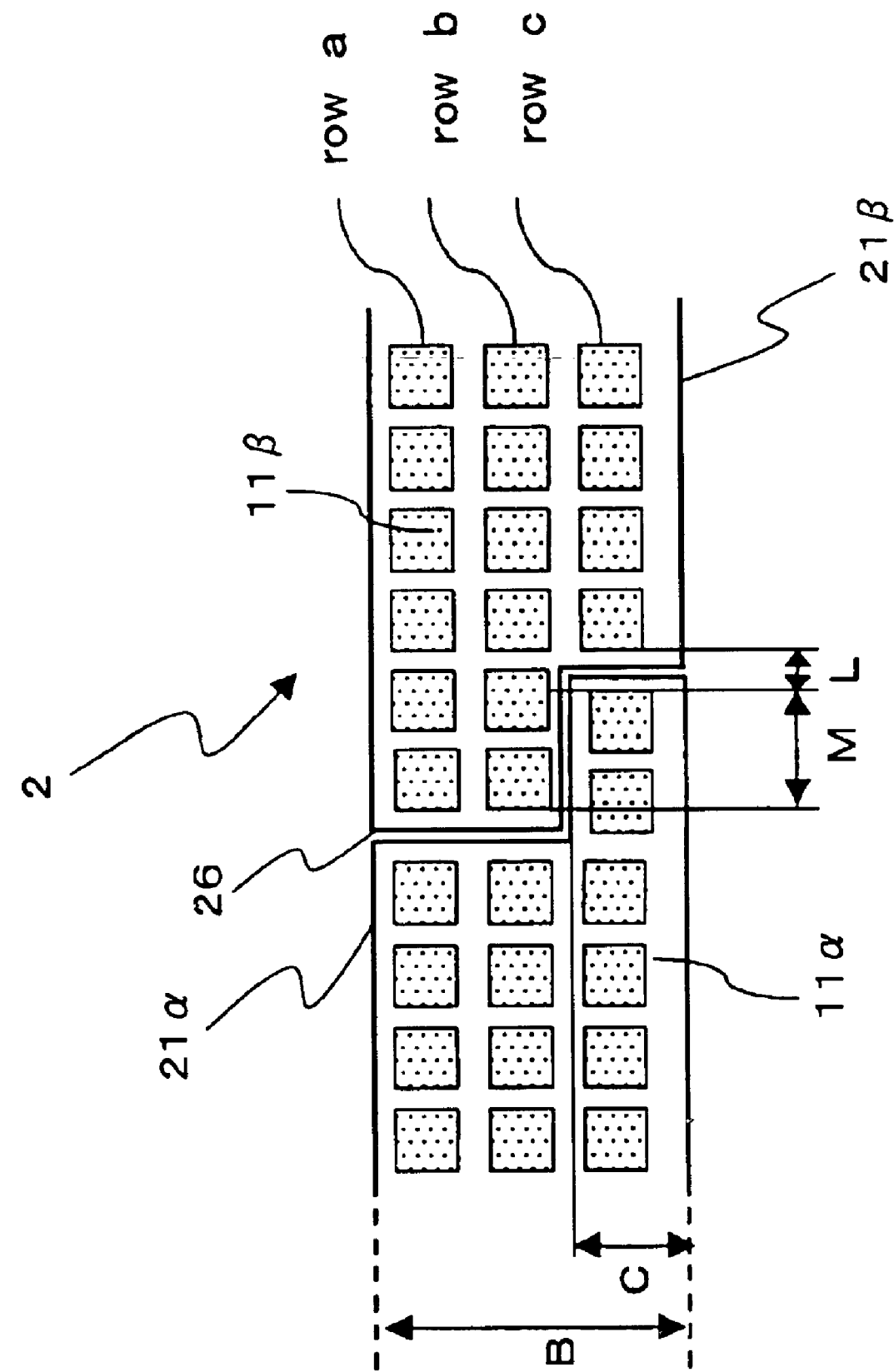
FIG. 13 is a view showing a light source in the shape of substantially a letter L.

Moreover, the above fault is also alleviated, as shown in FIG. 13, by adopting a construction in which light source pieces 21 each have the shape of approximately a letter L. In the case of this construction, a length M along which emission segments 11α and 11β of the respective light source pieces 21α and 21β adjacent to each other overlap each other is desirably equal to or more than five times a distance L (a section deficient in emission segment) between the emission segments 11α and 11β in the main scan direction. Furthermore, in order to alleviate reduction in luminance at an end surface 26, a section deficient in emission segment 11 formed at a connection is formed so as to shift from the longitudinal center of a light source piece 21 in the width direction. In this case, a width of a protruded section C formed at one end section of a light source piece 21 is desirably one-third a width B of the light source 2.

Fifth Embodiment

Figure 14:
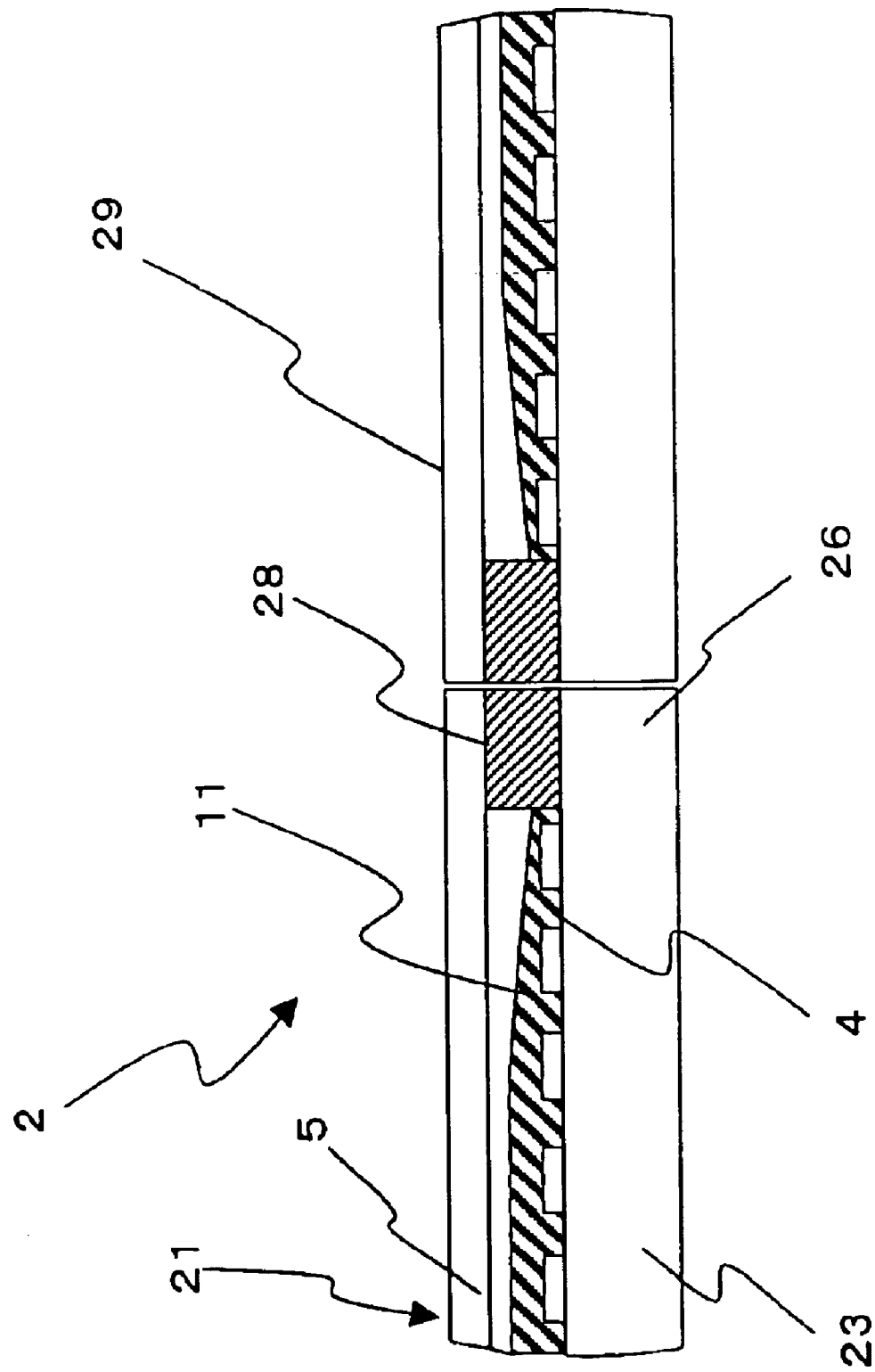
FIG. 14 is a view showing light source pieces each having emission segments located in end sections of rows thereof, a thickness of each of which is smaller than those of the others on the rows.

Luminance of respective light source pieces 21α and 21β are also varied by electrical field strengths in emission segments. That is, under the same potential difference between electrodes, as a thickness of a emission segment 11 is thinner, an electrical field strength is higher and a luminance increases. For example, by using this nature, a construction shown in FIG. 14 is considered. Transparent electrodes 4 are, as in the first embodiment, formed on a transparent substrate 2. A light emission layer 1 is laminated thereon such that a thickness thereof at a specific distance of, for example, 10 mm from an end surface 26 of the transparent substrate 2 is smaller than in the other parts. This process is different from that of the first embodiment. Thereafter a metal electrode layer 5 is laminated on the light emission layer 1.

In such a construction of a light source piece 21 as shown in FIG. 14, a thickness value of a emission segment 11 formed on the transparent substrate 21 as far as a specific distance, for example 10 mm, or less from the end surface 26 are smaller than in the central section of the emission segment 11, thereby enabling achievement of the object of the present invention.

Sixth Embodiment

A higher voltage is applied to emission segment groups T formed at a specific distance from end surfaces 26 of light source pieces 21α, 21β, . . . among emission segment groups T formed on transparent electrode segments 4 of the light source pieces 21α, 21β, . . . than to the other emission segment groups T.

By doing so, luminance values of emission segment groups T formed in a region covering as far as a specific distance from an end surface 26 increase, eliminating non-uniformity in luminance in the length direction of the light source 2.

Seventh Embodiment

In order to scale down an image writing device, a method has been available that uses lenses, of each of which a conjugate distance and size are smaller than the fiber lens described in the first embodiment, as a collective lens. In this embodiment, description will be given of an image writing device using microlenses of a light quantity transmission scheme as a collective lens 7 of a light source unit 10.

Figure 15C:
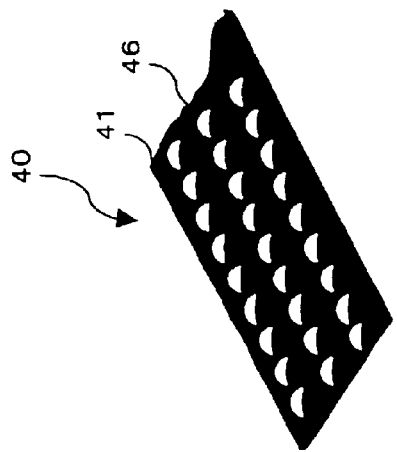
FIGS. 15A to 15C are views showing a fabrication process of microlenses.
Figure 15A:
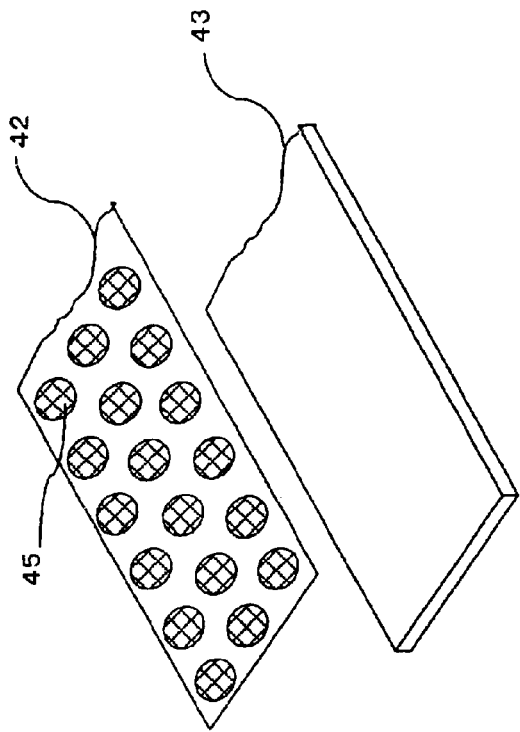

First of all, as shown in FIG. 15A, a photomask 42 on which plural light shielding portions 45 in the shape of a circle made of chromium or the like are provided is caused to cover one surface of a photosensitive glass 43. The photosensitive glass, as chemical composition, is composed of, for example, $SiO_2$—$Li_2O$-$AO_3$ based glass and a photosensitive metals (Au, Ag and Cu) and a sensitizer ($CeO_2$). A size of the photosensitive glass 43 is on the orders of 320 mm in length, 1 to 2 mm in width and 1 mm in thickness for example. The shielding portions 45 are formed, as described below, with a spacing therebetween equal to or less than a spacing of the emission segments 11 formed in the light source 2. This is because of a nature of a light quantity transmission scheme in which the same light quantity as a light quantity incident on a microlens 41 is emitted from the other side thereof.

Note that in this embodiment, there is used a photomask 12 on which shielding portions 45 of 12 μm in diameter are formed with the same pitch as that (14.1 μm) of the emission segments 11 described in the first embodiment. While, here, description is given with a size of a shielding portions 45 at 12 μm, the size thereof is not limited to 12 μm.

Figure 15B:
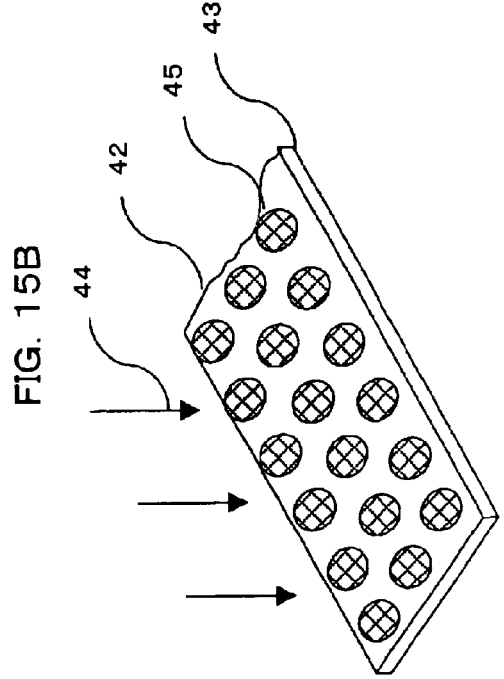

Then, the photosensitive glass 43 on which the photomask 42 is placed to cover, as shown in FIG. 15B, is subjected to a heat treatment at 500° C. and the surface of the photosensitive glass 43 is illuminated with ultraviolet of wavelengths in the range of 200 nm to 400 nm at a dosage in the range of from 7,500 to 10,000 $\mu J/Cm^2$. With the ultraviolet illumination, parts of the photosensitive glass 43 with no coverage of the shielding portions 45 are shrunk. With the shrinkage, parts of the photosensitive glass 43 covered by the shielding portions 45 assume a hemisphere serving as a microlens 41, while on the other hand, parts shrunk under illumination with ultraviolet are reduced in light transmittance to serve as a shielding layer 46 preventing cross talk between microlenses 41 and flare light from generating. In such away, a microlens array 40 is obtained in which microlenses 41 are formed in a matrix.

The microlens array 40 can be used as the collective lens 7 of the light source 2 described in the first embodiment (shown in FIG. 3). In that case, the microlens array 40 is, as shown in FIG. 16A, placed on the light source 2 with a spacer S inserted therebetween.

When the microlens array 40 is used as a collective lens 7, a light beam emitted from one emission segment 11 passes through one microlens 41 to impinge on a photosensitive drum 6 for illumination. As shown in FIG. 16A, however, it is not easy to technically position the microlens array 40 and the light source 2 with emission segments 11 adapted in terms of a size and a position such that light emitted from one emission segment 11 is directed for illumination to the photosensitive drum through one microlens 41.

Therefore, as shown in FIG. 16B, a light beam emitted from one emission segment 11 passes through plural microlenes 41 to impinge on the photosensitive drum 6 for illumination. In doing so, it is of course easy to mount the microlens array 40 to the light source 2 and it is also easy to design the microlens array 40 and the light source 2. In this case, there is used a microlens array 40 with a spacing between adjacent microlenses 41 smaller than a spacing of the emission segments 11.

In the case where, a micolens array 40 is, as shown above, used as a collective lens, a distance from a emission segment 11 to a photosensitive drum 6 (that is a conjugate distance) can be reduced as small as 3 mm or less. By doing so, needless to say that an image writing device can be considerably scaled down as compared with a prior art device of its kind. This is because not only is a microlens 41 itself small in size, but a microlens 41 fabricated as described above is also of a light quantity transmission scheme, leading to no requirement for consideration of a focal length.

Moreover, with adoption of a microlens 41 of a light quantity transmission scheme, a possibility arises of freedom in dispersion of a diameter of a spot light directed to a photosensitive drum 6 for illumination, which will be described below.

That is, since a rod lens 113 of an image transmission scheme was adopted in a prior art, projection of a sharp image on a photosensitive drum 6 required that a diameter of a emission segment 11 was equal to that of the spot light.

In contrast to this, since a microlens fabricated as described above is a lens of a light quantity transmission scheme, a difference in diameter between the emission segment 11 and the spot light (if any) would result in non-clearness of a projected image on a photosensitive drum 6. Furthermore, a diameter of the spot light can be freely varied by adjusting a curvature radius of a microlens 41 or the like. Therefore, needless to say that an image can be projected on the photosensitive drum 6 without a gap.

A fabrication process for a microlens aray 40 is not limited to the above process, but, for example, it can also be fabricated by means of injection molding. In this case, as materials thereof, there can be exemplified heat resisting acrylic resin and amorphous polyolefin and among them, it is preferable to select a material strong against high temperature, high humidity and thermal shock and high in light transmittance.

Figure 17A:
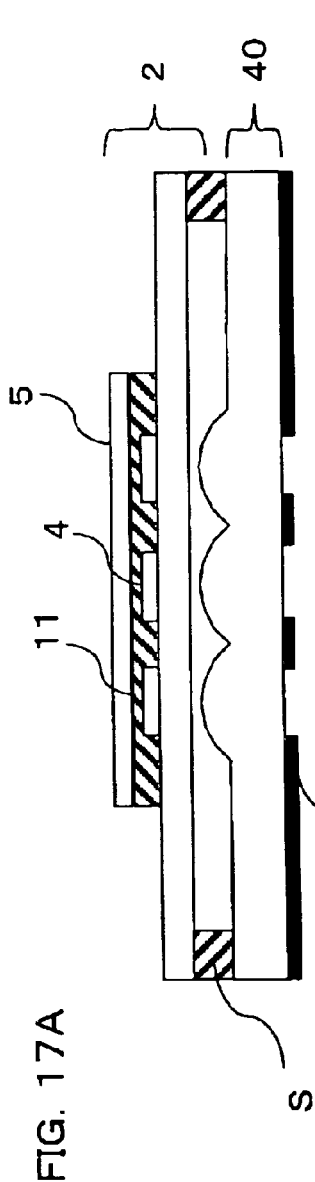
FIGS. 17A to 17C are views describing a microlens array fabricated by means of injection molding.
Figure 17B:
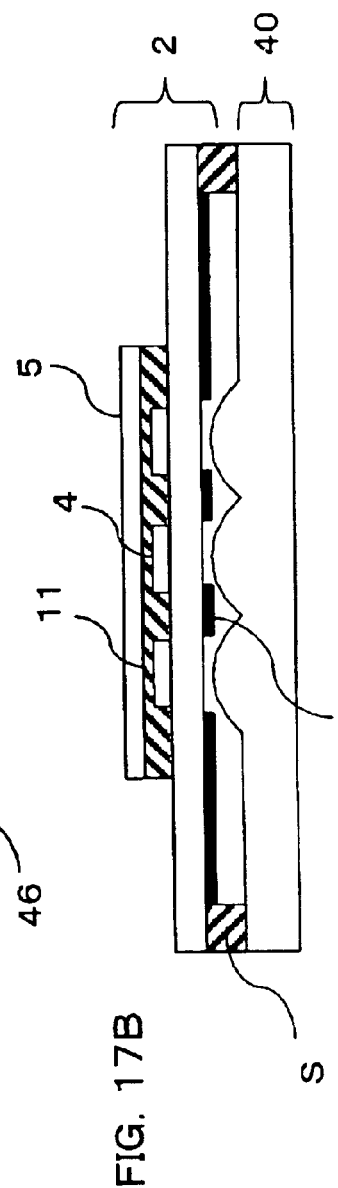
Figure 17C:
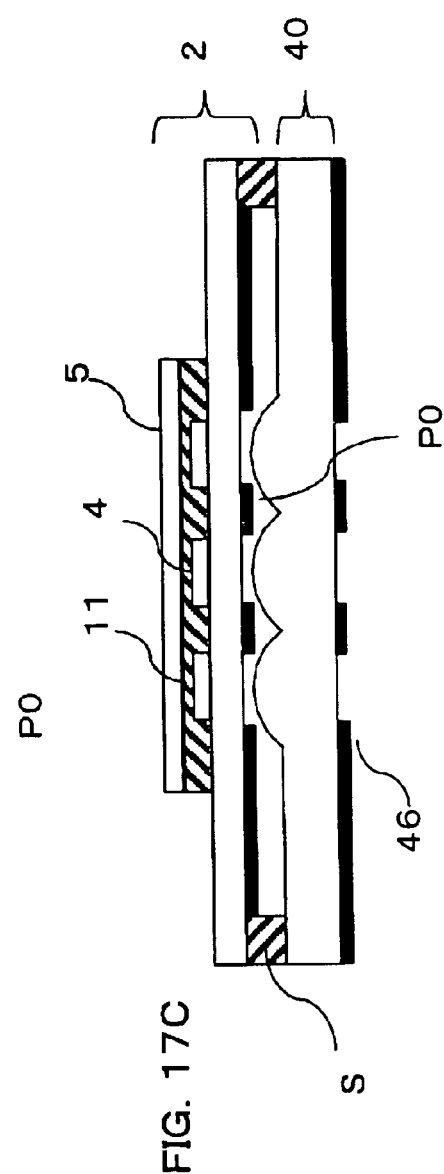
Figure 18:
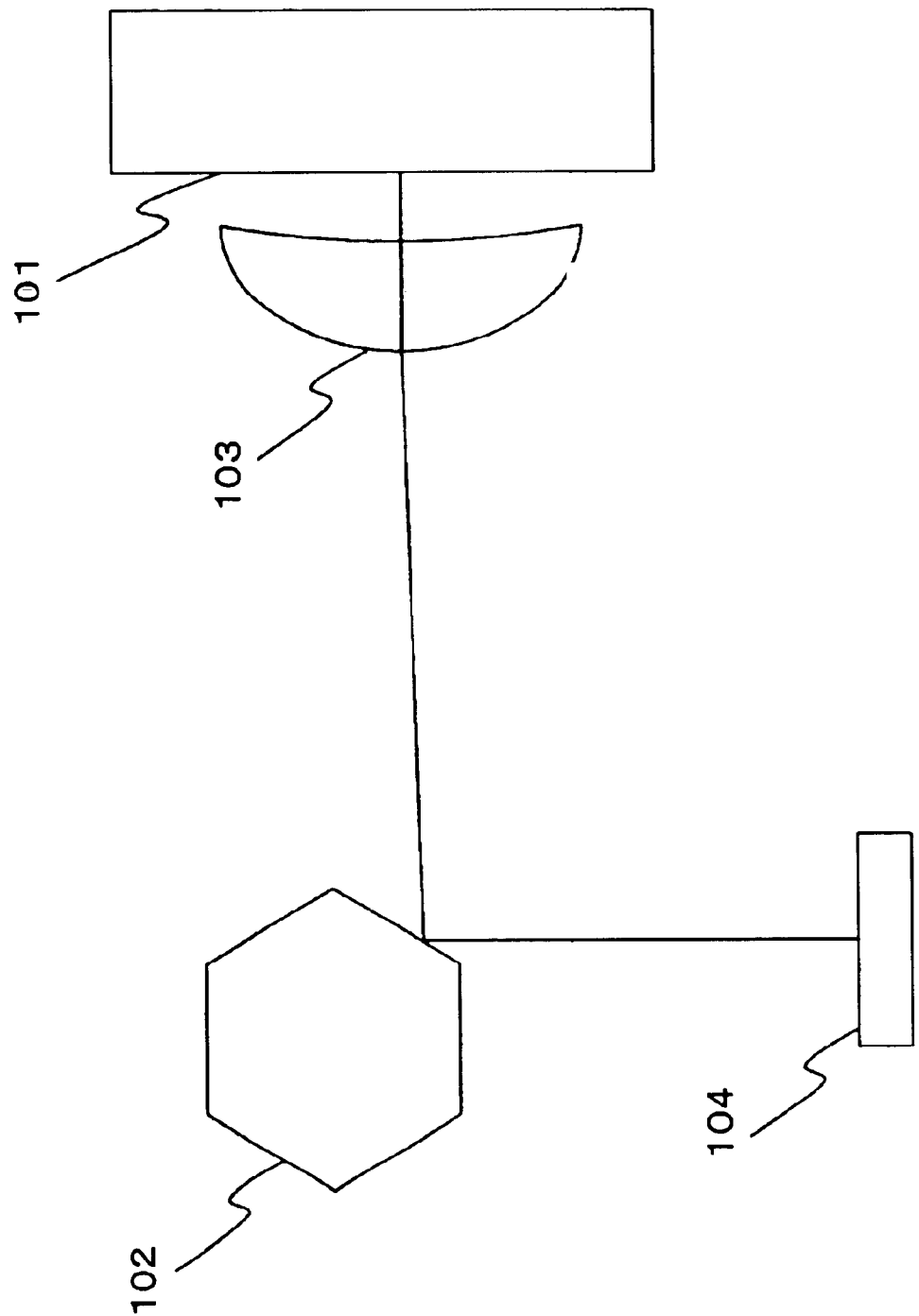
FIG. 18 is an illustration of a conventional writing device.

Note that in a case where a micorlens array 40 is fabricated by means of injection molding in such a way, a shielding layer 46 therefor may be provided only on the side facing a photosensitive drum 6 as shown in FIG. 17A or alternatively, only on the side facing light source 2 as shown in FIG. 17B. A similar effect can be attained even when the shielding layers 46 are provided both on the side facing the photosensitive drum 6 and the side facing the light source 2. As shown in FIG. 17C in a case where a microlens array 40 fabricated by means of injection molding as described above is installed to the light source 2, the spacer S is used as insertion. Note that in the case where as shown in FIGS. 17B and 17C, the shielding layer 46 is provided on the side facing the light source 2, a space PO between the lens surface and the shielding layer 46 may be of vacuum or a cavity.

Moreover, while in the above description, as light source 2 adopted in the light source unit 10, there is exemplified light source 2 using an electroluminescence film as an optical medium, The present invention is not limited to this. That is, the prior art LED array 110 can be used instead of the light source 2 without a problem.

According to the present invention, as described above, by constituting the light source for one pixel with plural emission segments, printing of an image can be performed without unevenness in density even if performing no shading correction. Moreover, by adjusting the number of emission segments to emit light, luminance values of emission segment groups can be varied.

Furthermore, in a case where light source pieces are connected to each other, light of a uniform intensity in the length direction can be emitted; therefore, dispersion in luminance can be reduced without performing shading correction.

Since a distance from light source to a photosensitive drum (that is a conjugate distance) can be as small as 3 mm or less, a device can be considerably down sized as compared with a prior art device of its kind.

Moreover, according to the present invention, since a diameter of a spot light directed for illumination to a photosensitive drum can be freely varied, an image can be projected on the photosensitive drum without a gap.

What is claimed is:

1. An image writing device in which a photosensitive member is illuminated with light emitted from a light source through a collective lens, comprising:
   a light source constituted of a transparent substrate on one surface of which emission segments are formed and the other surface of which is used as a light emission surface; and
   a collective lens configured so as to face said light emission surface of said transparent substrate,
   wherein said light source is formed by connecting plural light source pieces constituted of respective transparent substrate pieces on one surface of each of which emission segments are formed and the other surface of each of which is used as a light emission surface in a length direction, and
   a thickness of an emission segment formed in regions covering as far as a specific distance inward from both ends of a light source piece is smaller than that of an emission segment in the other region.

2. An image writing device in which a photosensitive member is illuminated with light emitted from a light source through a collective lens, comprising:
   a light source constituted of a transparent substrate on one surface of which emission segments are formed and the other surface of which is used as a light emission surface; and
   a collective lens configured so as to face said light emission surface of said transparent substrate,
   wherein said light source is formed by connecting plural light source pieces constituted of respective transparent substrate pieces on one surface of each of which emission segments are formed and the other surface of each of which is used as a light emission surface in a length direction, and
   said light source piece is in the shape of substantially a letter L.

3. The image writing device according to claim 2, wherein an end surface in a length direction of a light source piece is formed so as to shift from the center thereof in a width direction.

4. A light source for an image writing device formed by mutually interconnecting plural light source pieces each constituted of a transparent substrate one surface of which is used as a light emission surface and on the other surface of which emission segments are formed,
   wherein a thickness of an emission segment formed in regions covering as far as a specific distance inward from both ends of a light source piece is smaller than that of an emission segment in the other region.

5. A light source for an image writing device formed by mutually interconnecting plural light source pieces each constituted of a transparent substrate one surface of which is used as a light emission surface and on the other surface of which emission segments are formed,
   wherein a light source piece is in the shape of substantially a letter L.

6. The light source according to claim 5, wherein an end surface of said light source piece is formed so as to shift from the center thereof in a width direction.

7. An image writing device, comprising:
   a transparent substrate,
   emission segments formed on one surface of the transparent substrate and constituted of an electroluminescence film, wherein a transparent electrode, the electroluminescence film and a common electrode are formed on the one surface of the transparent substrate in such order, and
   a collective lens configured on the other surface of the transparent substrate,
   wherein a focus point of light emitted from the emission segment is located on the photosensitive member by adjusting the thickness of the transparent substrate.

8. An image writing device, comprising:
   a light source constituted of a transparent electrode, emission segments and a common electrode,
   a transparent substrate transmitting light from the light source, and
   a collective lens configured on a surface different from a surface on which the light source is formed, and illuminate a photosensitive member with the light from the light source through the transparent substrate,
   wherein;
   a focus point of light emitted from the emission segment is configured on the photosensitive member by adjusting the thickness of the transparent substrate.

9. The image writing device according to claim 8, wherein the transparent electrode, the emission segments and the common electrode are formed on the surface of the transparent substrate in such order.

10. The image writing device according to claim 8 wherein each transparent electrode is an individual electrode corresponding to each emission segment and the common electrode formed of metal is common to all emission segments.

11. An image writing device, comprising:

a transparent substrate;

emission segments formed on one surface of the transparent substrate and constituted of an electroluminescence film; and a collective lens configured on the other surface of the transparent, wherein each emission segment arranged, to form one pixel with plural emission segments, and so as not to duplicate the focus of each light beam formed by each emission segment on a photo sensitive member.

12. The image writing device according to claim 11, wherein each emission segment is arranged so as to illuminate the periphery of an area illuminated with the light beam formed by the adjacent emission segment.

13. The image writing device according to claim 11, further comprising emission control means controlling light emission of each of the emission segments.

14. The image writing device according to claim 13, wherein the emission control means determines the number of emission segments constituting a light source for one pixel on the basis of the number of pixels of the image data and the number of the emission segments.

15. The image writing device according to claim 13, wherein the emission control means determines the number of emission segments to emit light in each emission segment group forming a pixel on the basis of luminance of each emission segment group.

16. The image writing device according to claim 13, wherein the emission control means determines the number of emission segments to emit light in each emission segment group formed a pixel on the basis of a density value of each emission segment group.

17. An image writing device including a light source with plural light source pieces, wherein the light source piece comprises:

a transparent substrate;

emission segments formed on the transparent substrate and constituted of an electroluminescence film; and a sealing section formed at the circumference of the transparent substrate, and the light source is formed by connecting the plural light source pieces in the length direction so as to reduce the difference between the luminance of the sealing section and the luminance of the other sections.

18. The image writing device according to claim 17, wherein one pixel is formed with plural emission segments.

19. The image writing device according to claim 17, wherein one of the light source pieces is connected to another light source piece so as to overlap each other in a specific direction.

20. The image writing device according to claim 17, wherein a light emission area of the emission segment formed in regions covering as far as a specific distance inward from both ends of the light source piece is larger than that of an emission segment in the other region.

21. The image writing device according to claim 17, wherein both end surfaces of the light source piece are inclined at a specific angle with respect to a width direction of the light source piece.

22. The image writing device according to claim 17, further comprising emission control means for applying a higher voltage to emission segment groups formed at a specific distance from end surfaces of the light source pieces than to the other emission segment groups.

23. A light source with plural light source pieces, wherein the light source piece comprises:

a transparent substrate;

emission segments formed on the transparent substrate and constituted of an electroluminescence film; and a sealing section formed at the circumference of the transparent substrate, and the light source is formed by connecting the plural light source pieces in the length direction so as to uniform the luminance.

24. The light source according to claim 23, wherein one pixel is formed with plural emission segments.

25. The light source according to claim 23, wherein a light emission area of the emission segment formed in regions covering as far as a specific distance inward from both ends of the light source piece is larger than that of an emission segment in the other region.

26. The light source according to claim 23, wherein both end surfaces of the light source piece are inclined at a specific angle with respect to a width direction of the light source piece.

27. The light source according to claim 23, further comprising emission control means for applying a higher voltage to emission segment groups formed at a specific distance from end surfaces of the light source pieces than to the other emission segment groups.

28. The light source according to claim 23, wherein one of a light source piece is connected to another light source piece so as to overlap each other in a specific direction.

* * * * *